(12) United States Patent
Kambe et al.

(10) Patent No.: US 6,884,359 B2
(45) Date of Patent: Apr. 26, 2005

(54) APPARATUS AND METHOD FOR CONTROLLING RESISTIVITY OF ULTRA PURE WATER

(75) Inventors: Toshio Kambe, Ichihara (JP); Kazunari Sakai, Yotsukaido (JP); Kazumi Oi, Ichihara (JP); Koji Kawase, Yotsukaido (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 136 days.

(21) Appl. No.: 09/960,727

(22) Filed: Sep. 24, 2001

(65) Prior Publication Data

US 2002/0063345 A1 May 30, 2002

(30) Foreign Application Priority Data

Sep. 27, 2000 (JP) ..................... P2000-294219

(51) Int. Cl.$^7$ ................................ C02F 1/00
(52) U.S. Cl. .................... 210/749; 210/192; 210/198.1; 210/500.23; 210/900; 261/75
(58) Field of Search ................................ 210/749, 192, 210/198.1, 500.23, 900; 261/75

(56) References Cited

U.S. PATENT DOCUMENTS 5,188,257 A * 2/1993 Plester
6,158,721 A 12/2000 Katou et al.

FOREIGN PATENT DOCUMENTS

| JP | 59-173184 | 1/1984 |
|---|---|---|
| JP | 59-196706 | 11/1984 |
| JP | 59-229320 | 12/1984 |
| JP | 60-027603 | 2/1985 |
| JP | 61-101206 | 5/1986 |
| JP | 61-101227 | 5/1986 |
| JP | 06-210146 | 8/1994 |
| JP | 7-60082 | 7/1995 |
| JP | 10-212105 | 11/1998 |
| JP | 11-139804 | 5/1999 |
| JP | 2000 - 159504 | 6/2000 |

* cited by examiner

Primary Examiner—Betsey Morrison Hoey
(74) Attorney, Agent, or Firm—Armstrong, Kratz, Quintos, Hanson & Brooks, LLP

(57) ABSTRACT

An apparatus for controlling the resistivity of ultra pure water, including a housing to house a gas permeable membrane, an inlet for untreated ultra pure water which communicates with an ultra pure water path, and an outlet for resistivity-controlled ultra pure water which communicates with the ultra pure water path. The gas permeable membrane divides the interior of the housing into the ultra pure water path and a mixed gas path. A mixed gas is selected from the group consisting of a mixed gas including carbon dioxide and a gas having a lower resistivity controlling ability than carbon dioxide and a mixed gas including ammonia and a gas having a lower resistivity controlling ability than ammonia. The gas permeable membrane is capable of supplying carbon dioxide or ammonia to the untreated ultra pure water at a concentration equal to or more than 90% of the equilibrium concentration.

19 Claims, 3 Drawing Sheets

APPARATUS AND METHOD FOR CONTROLLING RESISTIVITY OF ULTRA PURE WATER

BACKGROUND OF THE INVENTION

1. Field of the invention

The present invention relates to apparatuses and methods for controlling the resistivity of ultra pure water to be used as cleaning water in the production of semiconductor or liquid crystal devices.

2. Background art

It is widely known that when a photomask substrate, silicone wafer, or glass plate is cleaned, or when a wafer is cut by a dicing machine, by using ultra pure water (resistivity $\geq 18$ M $\Omega$-cm) in the process of producing semiconductor or liquid crystal devices, due to the high resistivity of the ultra pure water, static electricity is generated which causes dielectric 15 breakdown or adsorption of particulates, thereby exerting marked undesirable effects on the production rate of the substrate.

Accordingly, in order to avert such undesirable effects, a method has been generally known in which the resistivity of the ultra pure water is reduced to about 0.01–15 M $\Omega$-cm by dissolving carbon dioxide in the ultra pure water.

Also, since the flow rate of the ultra pure water is largely changed in the processes of cleaning, dicing, etc. of a silicone wafer, it is required that the resistivity of the ultra pure water be unchanged even if the flow rate of the ultra pure water is vigorously changed. In order to make improvements with this regard, U.S. Pat. No. 6,158,721 discloses a method in which ultra pure water, which is supplied corresponding to the rate of consumption, is divided into two flows with constant proportions, one of which is larger than the other, by a distributing device. The smaller flow is supplied to a gas permeation membrane module so that carbon dioxide or ammonia is dissolved in the flow so as to be a certain concentration which is more than 90% of the equilibrium concentration determined by the gas pressure and the temperature of the ultra pure water. Then, the smaller flow of the ultra pure water, to which carbon dioxide or ammonia has been added is combined with the larger flow of untreated ultra pure water, and is mixed uniformly so that the resistivity of the combined ultra pure water may be constantly maintained even if the flow rate of the raw ultra pure water is changed.

However, in the above-mentioned method, since the mixing ratio of the ultra pure water, to which carbon dioxide or ammonia is dissolved at a high concentration in order to achieve a desired resistivity, with respect to the untreated raw ultra pure water, i.e., [ultra pure water to which carbon dioxide or ammonia is dissolved at high concentration]/[untreated raw ultra pure water], is very small, it is not easy to constantly maintain the above-mentioned mixing ratio when the flow rate of the ultra pure water is changed. Thus, according to the above method, it is sometimes unavoidable that the change in the resistivity of the ultra pure water increases.

SUMMARY OF THE INVENTION

The object of the present invention is to provide an apparatus for controlling the resistivity of ultra pure water which is simple and compact without necessitating a controlling mechanism, and a method for controlling the resistivity of ultra pure water using such a simple and compact apparatus.

The present invention provides an apparatus for controlling resistivity of ultra pure water including: a housing to house a gas permeable membrane, the gas permeable membrane dividing the interior of the housing into an ultra pure water path and a mixed gas path wherein a mixed gas, selected from the group consisting of a mixed gas including carbon dioxide and a gas having a lower resistivity controlling ability than carbon dioxide and a mixed gas including ammonia and a gas having a lower resistivity controlling ability than ammonia, passes the mixed gas path, and the housing has an opening for supplying the mixed gas through which the mixed gas path communicates with the exterior of the housing; an inlet for untreated ultra pure water which communicates with the ultra pure water path; and an outlet for resistivity-controlled ultra pure water which communicates with the ultra pure water path, wherein the gas permeable membrane is capable of supplying carbon dioxide or ammonia to the untreated ultra pure water which passes through the ultra pure water path at a concentration equal to or more than 90% of the equilibrium concentration.

The present invention also provides a apparatus for controlling resistivity of ultra pure water including a membrane module having a gas permeable membrane, the membrane module being capable of supplying carbon dioxide or ammonia to untreated ultra pure water so that the concentration of carbon dioxide or ammonia in the ultra pure water becomes equal to or more than 90% of the equilibrium concentration within an expected fluctuation range of the flow rate of the untreated ultra pure water, and a unit which produces ultra pure water in which carbon dioxide gas or ammonia has been dissolved in a sufficient amount to obtain a desired resistivity at any flow rate of the ultra pure water supplied, by contacting the ultra pure water with a mixed gas, selected from the group consisting of a mixed gas comprising carbon dioxide and a gas having a lower resistivity controlling ability than carbon dioxide and a mixed gas comprising ammonia and a gas having a lower resistivity controlling ability than ammonia, via the gas permeable membrane.

In accordance with another aspect of the invention, the above apparatus for controlling resistivity of ultra pure water further includes a housing to house the membrane module having the gas permeable membrane; and a valve for maintaining a constant pressure of the mixed gas.

In accordance with another aspect of the invention, the membrane module, which is capable of producing ultra pure water in which carbon dioxide or ammonia is dissolved, is a hollow-fiber membrane module.

In accordance with another aspect of the invention, the hollow-fiber membrane module is of an internal water-flow type comprising a housing and a bundle of a plurality of hollow fiber membranes housed in the housing, in which the mixed gas is injected into a space between the exterior of the hollow-fiber membranes and the housing, and in which the ultra pure water flows inside the hollow-fiber membranes.

In accordance with another aspect of the invention, the hollow-fiber membrane module is of an external water-flow type comprising a housing and a bundle of a plurality of hollow fiber membranes housed in the housing, in which the mixed gas is injected inside the hollow fiber membranes, and in which the ultra pure water flows in a space between the exterior of the hollow-fiber membranes and the housing.

In accordance with another aspect of the invention, the above apparatus for controlling resistivity of ultra pure water further includes a device which maintains a constant flow rate of the mixed gas.

In accordance with another aspect of the invention, the above apparatus for controlling resistivity of ultra pure water further includes a device which produces the mixed gas.

In accordance with another aspect of the invention, in the above apparatus for controlling resistivity of ultra pure water, the mixed gas is air.

The present invention also provides a method for controlling resistivity of ultra pure water, including the steps of: supplying a mixed gas, selected from the group consisting of a mixed gas including carbon dioxide and a gas having a lower resistivity controlling ability than carbon dioxide and a mixed gas including ammonia and a gas having a lower resistivity controlling ability than ammonia, to a flow of ultra pure water via a gas permeable membrane; and producing resistivity-controlled ultra pure water by dissolving carbon dioxide or ammonia in the ultra pure water to a concentration equal to or more than 90% of the equilibrium concentration which is determined by the concentration of carbon dioxide or ammonia in the mixed gas, the partial pressure of carbon dioxide or ammonia in the mixed gas, and the temperature of the ultra pure water.

The present invention also provides a method for controlling resistivity of ultra pure water, including the step of: contacting ultra pure water with a mixed gas, selected from the group consisting of a mixed gas comprising carbon dioxide and a gas having a lower resistivity controlling ability than carbon dioxide and a mixed gas comprising ammonia and a gas having a lower resistivity controlling ability than ammonia, via a membrane module having a gas permeable membrane, the membrane module being capable of supplying carbon dioxide or ammonia to the ultra pure water so that the concentration of carbon dioxide or ammonia in the ultra pure water becomes equal to or more than 90% of the equilibrium concentration within an expected fluctuation range of the flow rate of the untreated ultra pure water, whereby resistivity-controlled ultra pure water is produced in which carbon dioxide gas or ammonia has been dissolved in a sufficient amount to obtain a desired resistivity at any flow rate of the ultra pure water supplied.

In accordance with another aspect of the invention, air is used as the mixed gas in the above method for controlling resistivity of ultra pure water.

The present invention also provides a method for controlling resistivity of ultra pure water using the above apparatus for controlling resistivity of ultra pure water.

According to the present invention, it becomes easy to control the resistivity of ultra pure water by dissolving a mixed gas comprising carbon dioxide and a gas having a lower resistivity controlling ability than carbon dioxide, or a mixed gas comprising ammonia and a gas having a lower resistivity controlling ability than ammonia, into the ultra pure water which is supplied corresponding to the rate of consumption. Also, according to the present invention, unlike U.S. Pat. No. 6,158,721, it is unnecessary to provide a distributing device such as a bypass line, and a simple and compact device may be provided.

Moreover, when the ultra pure water treated by the present invention is used for a wet-process cleaner connected downstream of the apparatus of the present invention, ultra pure water having a desired resistivity can be easily and constantly supplied to the cleaner without using any control device, even if the flow rate of the ultra pure water used suddenly varies.

BRIEF DESCRIPTION OF THE DRAWINGS

Some of the features and advantages of the invention having been described, others will become apparent from the detailed description which follows, and from the accompanying drawings, in which.

DESCRIPTION OF THE PREFERRED EMBODIMENTS

The invention summarized above and defined by the enumerated claims may be better understood by referring to the following detailed description, which should be read with reference to the accompanying drawings. This detailed description of particular preferred embodiments, set out below to enable one to build and use particular implementation of the invention, is not intended to limit the enumerated claims, but to serve as particular examples of the invention.

As explained above, the present invention provides an apparatus for controlling the resistivity of ultra pure water which is simple and compact without necessitating a complicated controlling mechanism, and a method for controlling the resistivity of ultra pure water using such a simple and compact apparatus.

Figure 1:
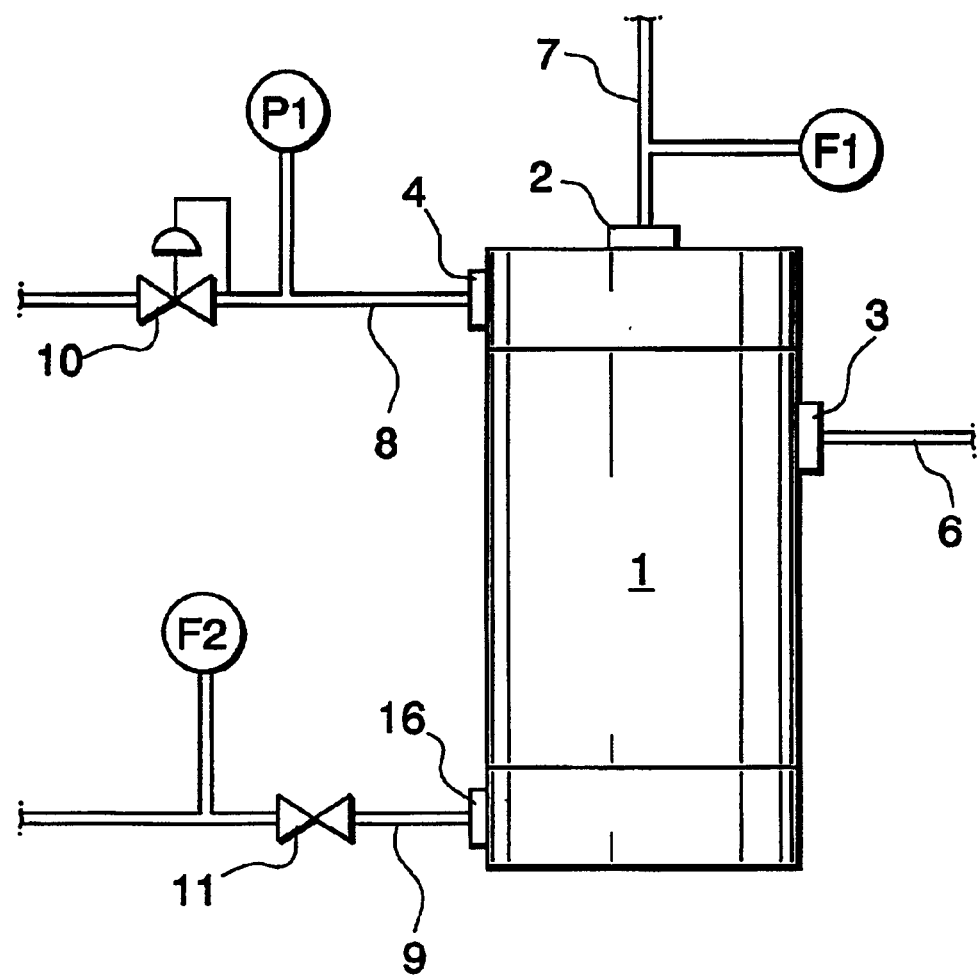
FIG. 1 is a schematic view showing an example of an apparatus according to an embodiment of the present invention for adding carbon dioxide gas to ultra pure water for the purpose of controlling the resistivity.
Figure 2:
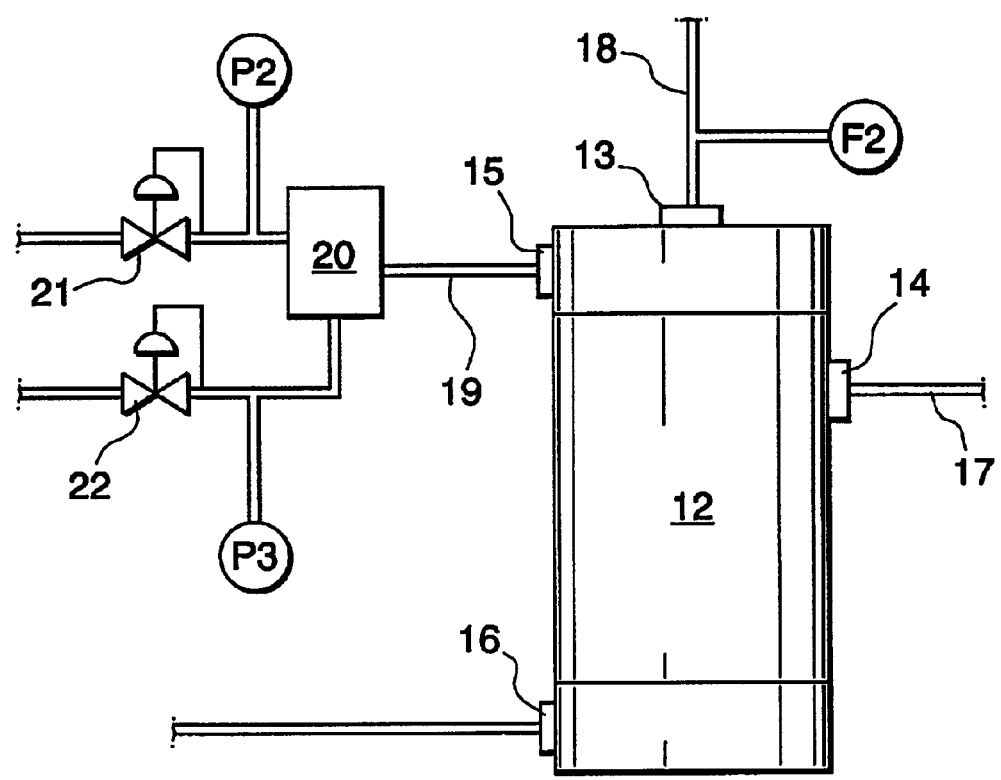
FIG. 2 is a schematic view showing an example of an apparatus according to another embodiment of the present invention for adding ammonia gas to ultra pure water for the purpose of controlling the resistivity.

FIGS. 1 and 2 are diagrams for explaining an apparatus for controlling the resistivity of ultra pure water according to the embodiments of the present invention.

In the apparatus shown in FIGS. 1 and 2, a membrane module is provided in order to increase the efficiency of dissolving a mixed gas, and carbon dioxide or ammonia is supplied and dissolved in the ultra pure water via the membrane module.

The material, structure, morphology, etc. of a gas permeable membrane which may be used in the embodiments of the present invention are not particularly limited as long as the membrane has a large permeation rate for carbon dioxide or ammonia. However, it is preferable to use a material having high hydrophobicity for the gas permeable membrane. Examples of such a material include, for instance, polyethylene type resins; polypropylene type resins; fluororesins, such as poly(tetrafluoroethylene), perfluoroalkoxyfluororesins, and polyhexafluoropropylene; polybutene type resins, silicone type resins; and poly-4-methylpentene-1 resins. Also, as for the membrane structure, any of a microporous membrane, a homogeneous membrane, a heterogeneous membrane, a composite membrane, and a so-called sandwich membrane in which a thin membrane made of urethane, etc. is sandwiched by, for instance, a polypropylene microporous membrane may be used. Examples of the morphology of the membrane include, for instance, a flat membrane, a hollow-fiber membrane, etc. Among them, use of a hollow-fiber membrane is preferable in terms of its efficiency in dissolving gases.

It is preferable that the permeation rate of carbon dioxide or ammonia of the hollow-fiber membrane be equal to or greater than $1 \times 10^{-6}$ $cm^3/cm^2 \cdot sec \cdot cmHg$ ($=7.5 \times 10^{-12}$ $m^3/m^2 \cdot sec \cdot Pa$) and equal to or smaller than $10^{-2}$ $cm^3/cm^2 \cdot sec \cdot cmHg$ ($=7.5 \times 10^{-9}$ $m^3/m^2 \cdot sec \cdot Pa$). If the rate is smaller than $1\times10^{-6}$ cm$^3$/cm$^2$·sec·cmHg (=$7.5\times10^{-12}$ m$^3$/m$^2$·sec·Pa), the target resistivity of the ultra pure water may not be obtained or the resistivity may change when the flow rate of the ultra pure water changes because the rate of carbon dioxide or ammonia permeating the hollow-fiber membrane is too low. In contrast, if the permeation rate of the hollow-fiber membrane is greater than $10^{-2}$ cm$^3$/cm$^2$·sec·cmHg (=$7.5\times10^{-9}$ m$^3$/m$^2$·sec·Pa), there is a danger that the mixed gas including carbon dioxide or ammonia will cause bubbles in the ultra pure water, or the ultra pure water will permeate into the mixed gas including carbon dioxide or ammonia when the mixed gas is supplied at a gauge pressure of 0.098 MPa or greater. If the mixed gas including carbon dioxide or ammonia causes bubbles in the ultra pure water, it becomes difficult to control the resistivity of the ultra pure water so as to be constant.

According to an embodiment of the present invention, it is most preferable to use a hollow-fiber heterogeneous membrane made of poly-4-methylpentene-1 due to its excellent permeability to carbon dioxide or ammonia and its high moisture barrier property. Such heterogeneous membranes which may be used in the embodiments of the present invention are described in detail in, for instance, Japanese Examined Patent Application, Second Publication (Kokoku), No. Hei 2-38250, Japanese Examined Patent Application, Second Publication (Kokoku), No. Hei 2-54377, Japanese Examined Patent Application, Second Publication (Kokoku), No. Hei 4-15014, Japanese Examined Patent Application, Second Publication (Kokoku), No. Hei 4-50053, and Japanese Unexamined Patent Application, First Publication (Kokai), No. Hei 5-6656.

The gas permeability of polyethylene type resins, polypropylene type resins, or polyfluorovinylidene type resins is not very high. Therefore, in order to make such resins suitable for use in the embodiments of the present invention, it is required to form a microporous structure in such resins so that carbon dioxide or ammonia may permeate through the micropores to achieve a desirable solubility. In contrast, the above-mentioned heterogeneous membrane made of a poly-4-methylpentene-1 resin has a sufficiently high gas permeability and a thin membrane thickness at a compact layer portion. Accordingly, the entire membrane surface thereof may contribute to the permeation of carbon dioxide or ammonia, and as a result, the area of the membrane is substantially increased. Therefore, the use of a heterogeneous membrane made of a poly-4-methylpentene-1 resin is particularly preferable.

Also, the heterogeneous membrane made of a poly-4-methylpentene-1 resin has pores having an extremely small pore size which penetrate the membrane while maintaining high gas permeability. Accordingly, as compared with microporous membranes made of polypropylene or polyethylene, it has an excellent moisture barrier property.

The material for the housing in which the hollow-fiber membrane is provided may be anything as long as it does not release any contaminants into the ultra pure water. Examples of the material for the housing are polyolefins such as polyethylene, polypropylene, and poly-4-methylpentene-1; a fluorocarbon resins such as poly(vinylidene fluoride) and poly(tetrafluoroethylene); engineering plastics such as poly (ether ether ketone), poly(ether ketone), poly(ether sulfone), and polysulfone; and clean vinyl chloride resins which are used as a piping material for the ultra pure water because of its low release of contaminants.

A hollow-fiber membrane module, which may be of an internal water-flow type or an external water-flow type, can be constructed by providing a bundle of several hollow-fiber membranes in a housing. In a module of the internal water-flow type, a carbon dioxide mixed gas or an ammonia mixed gas is supplied to the space between the outside of the hollow-fiber membranes and the housing, and ultra pure water runs inside the hollow-fiber membranes. In a module of the external water-flow type, ultra pure water runs outside the hollow-fiber membranes, and a mixed gas runs inside the hollow-fiber membranes as disclosed in Japanese Examined Patent Application, Second Publication (Kokoku), No. Hei 5-21841.

When a module of an external water-flow type is used, in order to prevent channeling of water due to nonuniform charging of a housing with hollow-fiber membranes, hollow-fiber membranes may be effectively used in which the material itself forms a sheet or in which the material is formed into threads (for example, a sheet in which the hollow-fiber membranes are aligned parallel to each other in a sparse distribution while they are tied crosswise), the sheet being incorporated into the housing in the form of a fold, a scroll, or a bundle. Furthermore, the hollow-fiber membranes may be arranged in a suitable shape, for example, in a three-dimensional shape such as a shape in which the hollow-fiber membranes are wound crosswise around a cylindrical core.

The object of the present invention, i.e., reducing the resistivity of ultra pure water by dissolving carbon dioxide or ammonia in the ultra pure water, does not limit the apparatus of the present invention to either the internal water-flow type or external water-flow type.

According to the embodiments of the present invention, it is necessary to circulate a mixed gas through a module, and it is preferable that the flow rate thereof be constantly maintained. As for the structure, material, and type of control device, these are not particularly limited as long as a filtration process is carried out such that contaminants from a first gas supply side are not attached to the hollow-fiber membrane. Examples of such a control device include an orifice, a ball valve, a needle valve, a combination of a needle valve or a ball valve with a float type flowmeter or a mass flowmeter, and a mass flow controller. When a mass flow controller is employed, it is not necessary to carry out feedback control as in a conventional technique, and it is necessary to constantly maintain only the flow rate.

The flow rate of the mixed gas is determined based on the performance of the gas dissolving module and the range of flow rate of the ultra pure water used.

A mixed gas generator is a device for mixing two or more kinds of gases. Examples of the mixed gas generator include a gas blender made by combining a commercially available float flowmeter and a needle valve, and a gas blender made by combining a plurality of mass flow controllers.

In contrast to the background art in which precise automatic control of the flow rate and pressure of carbon dioxide was conducted, the concentration and pressure of a mixed gas according to the embodiments of the present invention need only be maintained at a constant value. Therefore, highly automated control of a valve is not necessary in the present invention. Also, the required concentration of carbon dioxide or ammonia in the ultra pure water is more than 90% of the equilibrium concentration determined by the temperature of the ultra pure water in which the mixed gas is dissolved and the partial pressure of carbon dioxide or ammonia in the mixed gas supplied. Moreover, the pressure of the mixed gas, which is a constant value, is preferably about 2.5 kgf/cm$^3$·G (=0.25 MPa·G) or less, for instance.

As for a carbon dioxide or ammonia pressure regulating valve, the structure, material, and type thereof are not particularly limited as long as a filtration process is carried out such that contaminants in a gas from a supply source side (i.e., a first side) are not attached to the hollow-fiber membrane. Examples of such a pressure regulating valve include a valve for controlling the pressure (a regulator), such as a pressure regulating valve, a bellows pressure valve, a pressure regulator, and a back pressure valve.

The components of the mixed gas other than carbon dioxide and ammonia, which have a lower resistivity control property, are not particularly limited. Examples of such components include nitrogen gas, helium gas, argon gas, and oxygen.

Atmospheric air containing about 300 ppm of carbon dioxide may be used as the mixed gas according to an embodiment of the present invention. Since the concentration of carbon dioxide in air (i.e., a mixed gas) is almost constant, use thereof is preferable in terms of its ease of use in adjusting operational conditions upon controlling the resistivity of the ultra pure water. Also, it is possible to add carbon dioxide to air corresponding to a desired resistivity of the ultra pure water.

EXAMPLES

The present invention will be more specifically described by examples. However, it is understood than the present invention is not by any means intended to be limited to these examples.

In these examples, the resistivity of the ultra pure water was measured using a commercially available resistivity measuring instrument ("CE-480R" manufactured by COS Co., Ltd.).

Example 1

Ultra pure water having a resistivity of 18.2 M $\Omega\sqrt{}$cm at 25° C. was used as the untreated ultra pure water. The flow rate of the ultra pure water was made to fluctuate in a range between 1 to 10 liters/minute. The fluctuation was made to occur in such a manner that the flow rate was maintained for one minute, and then was shifted to another flow rate. The supply pressure of the ultra pure water was 2 kgf/cm$^2$G (=0.20 MPa·G). This condition was the same for the following examples.

Air was used as the mixed gas, and 5 kgf/cm$^2$·G (=0.49 MPa·G) was supplied to the first side of a regulator so that the pressure thereof was adjusted by the regulator to be four different levels, i.e., 0.3, 0.5, 0.7, and 1.0 kgf/cm$^2$·G (=0.029, 0.049, 0.069, and 0.098 MPa·G).

The flow rate of the mixed gas was adjusted by the needle valve to be 30 NL/min.

Figure 3:
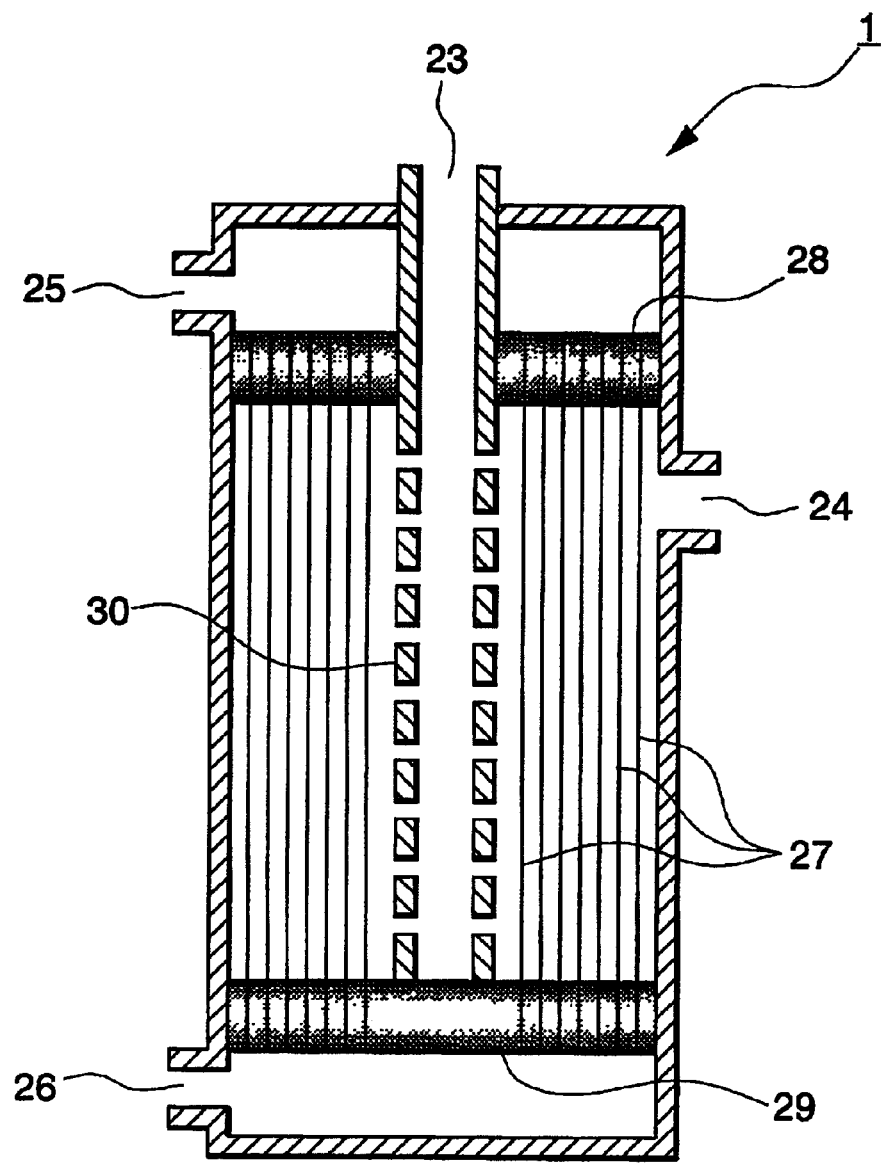
FIG. 3 is a diagram showing a cross-sectional view of a hollow-fiber membrane.

A hollow-fiber membrane module 1 of an external water-flow type for supplying a gas into ultra pure water having a membrane area of 40 m 2("SEPAREL EF-040P", a product of Dainippon Ink and Chemicals, Inc.) was obtained by making a bundle of hollow-fiber membranes of poly-4-methylpentene-1 having an inner diameter of 200 $\mu$m and an outer diameter of 250 $\mu$m, and fastening the bundle to the inside of a housing, which was made of a clean vinyl chloride resin, at both ends of the bundle of hollow-fiber membranes using a resin. FIG. 3 is a diagram showing a cross-sectional view of the hollow-fiber membrane 1. As shown in FIG. 3, the hollow-fiber membrane 1 includes an ultra pure water inlet 23, a resistivity-controlled ultra pure water outlet 24, a mixed gas inlet 25, a mixed gas outlet 26, hollow-fiber membrane 27, a hollow-fiber membrane sealing resins 28 and 29, and porous pipes 30. The permeation flux of carbon dioxide of the hollow-fiber membranes 27 was 3.5×10$^{-5}$ cm$^3$/cm$^2$·sec·cmHg (=2.6×10$^{-9}$ m$^3$/m$^2$·sec·Pa). The permeation flux of carbon dioxide gas was common to the following examples.

FIG. 1 is a schematic view showing the apparatus of Example 1, into which the hollow-fiber membrane module 1 is incorporated.

In the apparatus of Example 1, the hollow-fiber membrane module 1 includes an ultra pure water inlet 2 and an ultra pure water outlet 3 to which lines 7 and 6 are respectively attached. A flowmeter F1 is provided midway in the line 7 connected to the inlet 2. Also, a mixed gas inlet 4 and a mixed gas outlet 5 are provided, and a mixed gas supply line 8 and a mixed gas discharge line 9 are respectively connected thereto. A pressure regulating device (regulator) 10 is provided with the mixed gas supply line side, and a manometer P1 is disposed between the pressure regulating device 10 and the mixed gas inlet 4. A flow rate controlling device (needle valve) 11 is provided with the mixed gas discharge line 9, and a flowmeter (mass flowmeter) F2 is disposed at the gas discharge side of the flow rate controlling device 11.

The apparatus of Example 1 works as follows.

Ultra pure water whose resistivity has not been adjusted is introduced into the hollow-fiber membrane module 1 through the ultra pure water inlet 2, and the water flows outside of the hollow-fiber membrane in the module 1 so that a gas is dissolved in the water and ultra pure water whose resistivity has been adjusted is taken out from the ultra pure water outlet 3. The mixed gas is introduced into the module 1 from the mixed gas inlet 4 after its pressure is adjusted by the pressure regulating device (regulator) 10, and the mixed gas passes through the hollow-fiber and is discharged from the module 1 via the mixed gas outlet 5. The flow rate of the mixed gas is controlled by the flow rate controlling device (needle valve) 11 which is provided with the mixed gas discharge line 9. The flow rate of the ultra pure water, the pressure of the mixed gas, and the flow rate of the mixed gas are measured by the flowmeter F1 disposed at the line 7 for the ultra pure water inlet, the manometer P1 disposed between the pressure regulating device 10 and the mixed gas inlet 4, and the flowmeter F2 disposed at the downstream side of the flow rate controlling device 11, respectively.

The resistivity of the resistivity-controlled ultra pure water produced using the apparatus of FIG. 1 was measured while the total flow rate of the ultra pure water was made to fluctuate. The results for the change in resistivity with this apparatus are shown in Table 1. It was found that the resistivity of the ultra pure water depends on the pressure of air which is a mixed gas having a certain concentration, and the degree of change in the resistivity of the ultra pure water with respect to the flow rate change was about 5%.

TABLE 1

Change in Resistivity of Ultra Pure Water (M$\Omega$ · cm)

| Air Pressure | Flow Rate of Ultra Pure Water (L/min.) | | | | | |
|---|---|---|---|---|---|---|
| | 1 | 2 | 4 | 6 | 8 | 10 |
| 0.3 (kgf/cm$^2$) | 0.98 | 0.98 | 0.98 | 0.99 | 1.02 | 1.04 |
| 0.5 (kgf/cm$^2$) | 0.93 | 0.93 | 0.93 | 0.93 | 0.95 | 0.97 |
| 0.7 (kgf/cm$^2$) | 0.81 | 0.81 | 0.81 | 0.82 | 0.85 | 0.87 |
| 1.0 (kgf/cm$^2$) | 0.78 | 0.78 | 0.78 | 0.78 | 0.79 | 0.81 |

Example 2

In Example 2, ultra pure water having a resistivity of 18.2 M $\Omega$·cm at 25° C. was used as the untreated ultra pure water.

The flow rate of the ultra pure water was made to fluctuate in a range between 1 to 10 liters/minute. The fluctuation was made to occur in such a manner that the flow rate was maintained for one minute, and then was shifted to another flow rate. The supply pressure of the ultra pure water was 2 kgf/cm·G (=0.20 MPa·G).

Nitrogen gas and carbon dioxide were mixed to be used as a mixed gas. The mixing ratio of nitrogen gas with respect to carbon dioxide in the mixed gas (i.e., nitrogen gas: carbon dioxide) was, in terms of its volume ratio, 1000:1, 100:1, and 10:1. The flow rate of the mixed gas was 30.03 NL/min for 1000:1, 30.3 NL/min for 100:1, and 33 NL/min for 10:1.

A commercially available gas mixing flowmeter ("RK1200M", a product of Coffrock Co.), in which a needle valve and a float type flowmeter were combined, was used for mixing the nitrogen gas and carbon dioxide. Both the pressure of the nitrogen gas and that of carbon dioxide supplied to the gas mixing flowmeter were adjusted by a regulator to be 1.0 kgf/cm·G (=0.098 MPa~G).

FIG. 2 is a schematic view showing the apparatus of Example 2.

In the apparatus of Example 2, a hollow-fiber membrane module 12 includes an ultra pure water inlet 13 and an ultra pure water outlet 14 to which lines 18 and 17 are respectively attached. A flowmeter F2 is provided midway in the line 18 connected to the inlet 13. Also, a mixed gas inlet 15 and a mixed gas outlet 16 are provided with the hollow-fiber membrane module 12, and a mixed gas supply line 19 is connected to the mixed gas inlet 15. An outlet of a gas mixing device 20 is connected to the other end of the mixed gas supply line 19, and pressure regulating devices 21 and 22 are connected to two inlets of the gas mixing device 20, respectively. Manometers P2 and P3 are disposed between the two inlets of the gas mixing device 20 and the pressure regulating devices 21 and 22, respectively.

The apparatus of Example 2 works as follows.

Ultra pure water whose resistivity has not been adjusted is introduced into the hollow-fiber membrane module 12 through the ultra pure water inlet 13 via the line 18, and the water flows outside of the hollow-fiber membrane in the module 12 so that a gas is dissolved in the water and ultra pure water whose resistivity has been adjusted is taken out from the ultra pure water outlet 14. Carbon dioxide or ammonia is supplied to one of the pressure regulating devices 21 and 22, and a gas other than carbon dioxide and ammonia, or a carbon dioxide mixed gas or an ammonia mixed gas is supplied to the other one of the pressure regulating devices 21 and 22. The gases are supplied to the gas mixing device 20 after the pressures thereof are adjusted, and a mixed gas whose concentration has been adjusted to a certain value in the gas mixing device is introduced into the hollow-fiber membrane module 12 through the mixed gas inlet 15 via the mixed gas supply line 19. The mixed gas passes through the hollow-fiber membrane and is discharged from the mixed gas outlet 16. The flow rate of the mixed gas is controlled by the gas mixing device 20. The flow rate of the ultra pure water is measured by the flowmeter F2. The pressures of the gases supplied to the gas mixing device 20 are measured by the manometers P2 and P3, respectively.

The resistivity of the resistivity-controlled ultra pure water produced using the apparatus of FIG. 2 was measured while the total flow rate of the ultra pure water was made to fluctuate. The results for the change in resistivity with this apparatus are shown in Table 2. It was found that the resistivity of the ultra pure water depends on the concentration of carbon dioxide, and the degree of change in the resistivity of the ultra pure water with respect to the flow rate change was about 5%.

TABLE 2

Change in Resistivity of Ultra Pure Water (M$\Omega$ · cm)

| | Flow Rate of Ultra Pure Water (L/min.) | | | | | |
|---|---|---|---|---|---|---|
| Volume Ratio | 1 | 2 | 4 | 6 | 8 | 10 |
| $N_2/CO_2$ = 1000/1 | 0.91 | 0.91 | 0.91 | 0.91 | 0.93 | 0.95 |
| $N_2/CO_2$ = 100/1 | 0.43 | 0.43 | 0.43 | 0.44 | 0.45 | 0.46 |
| $N_2/CO_2$ = 10/1 | 0.12 | 0.12 | 0.12 | 0.12 | 0.13 | 0.14 |

Example 3

The hollow-fiber membrane module used in Example 3 was the same as that of Example 1, but the flow path for the mixed gas and the flow path for the ultra pure water were switched in the hollow-fiber membrane module. That is, a carbon dioxide mixed gas was made to flow outside the hollow-fiber membranes, and ultra pure water was made to flow inside the hollow-fiber membranes. The resistivity of the resistivity-controlled ultra pure water produced using the apparatus of Example 3 was measured under the same conditions as in Example 2.

The results for the change in resistivity of the ultra pure water with this apparatus are shown in Table 3. As shown in Table 3, the results are almost the same as those obtained in Example 2.

TABLE 3

Change in Resistivity of Ultra Pure Water (M$\Omega$ · cm)

| | Flow Rate of Ultra Pure Water (L/min.) | | | | | |
|---|---|---|---|---|---|---|
| Volume Ratio | 1 | 2 | 4 | 6 | 8 | 10 |
| $N_2/CO_2$ = 1000/1 | 0.91 | 0.91 | 0.91 | 0.91 | 0.93 | 0.95 |
| $N_2/CO_2$ = 100/1 | 0.43 | 0.43 | 0.43 | 0.44 | 0.45 | 0.46 |
| $N_2/CO_2$ = 10/1 | 0.12 | 0.12 | 0.12 | 0.12 | 0.12 | 0.13 |

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. An apparatus for controlling resistivity of ultra pure water, comprising:
   a mixed gas supply;
   a housing to house a gas permeable membrane, the gas permeable membrane dividing the interior of the housing into an ultra pure water path and a mixed gas path wherein a mixed gas from the mixed gas supply, selected from the group consisting of a mixed gas comprising carbon dioxide and a gas having a lower resistivity controlling ability than carbon dioxide and a mixed gas comprising ammonia and a gas having a lower resistivity controlling ability than ammonia, passes the mixed gas path, and the housing has an opening for supplying the mixed gas through which the mixed gas path communicates with the exterior of the housing;

an inlet for untreated ultra pure water which communicates with the ultra pure water path; and an outlet for resistivity-controlled ultra pure water which communicates with the ultra pure water path, wherein the gas permeable membrane is capable of supplying carbon dioxide or ammonia to the untreated ultra pure water which passes through the ultra pure water path at a concentration equal to or more than 90% of the equilibrium concentration.

2. An apparatus for controlling resistivity of ultra pure water, comprising:

a mixed gas supply;

a membrane module having a gas permeable membrane, the membrane module being capable of supplying carbon dioxide or ammonia to untreated ultra pure water so that the concentration of carbon dioxide or ammonia in the ultra pure water becomes equal to or more than 90% of the equilibrium concentration within an expected fluctuation range of the flow rate of the untreated ultra pure water, and a unit which produces ultra pure water in which carbon dioxide gas or ammonia has been dissolved in a sufficient amount to obtain a desired resistivity at any flow rate of the ultra pure water supplied, by contacting the ultra pure water with a mixed gas from the mixed gas supply, selected from the group consisting of a mixed gas comprising carbon dioxide and a gas having a lower resistivity controlling ability than carbon dioxide and a mixed gas comprising ammonia and a gas having a lower resistivity controlling ability than ammonia, via the gas permeable membrane.

3. An apparatus for controlling resistivity of ultra pure water according to claim 2, further comprising:

a housing to house the membrane module having the gas permeable membrane; and a valve for maintaining a constant pressure of the mixed gas.

4. An apparatus for controlling resistivity of ultra pure water according to claim 3, wherein the membrane module, which is capable of producing ultra pure water in which carbon dioxide or ammonia is dissolved, is a hollow-fiber membrane module.

5. An apparatus for controlling resistivity of ultra pure water according to claim 4, wherein the hollow-fiber membrane module is of an internal water-flow type comprising a housing and a bundle of a plurality of hollow fiber membranes housed in the housing, in which the mixed gas is injected into a space between the exterior of the hollow-fiber membranes and the housing, and in which the ultra pure water flows inside the hollow-fiber membranes.

6. An apparatus for controlling resistivity of ultra pure water according to claim 5, further comprising a device which maintains a constant flow rate of the mixed gas.

7. An apparatus for controlling resistivity of ultra pure water according to claim 6, wherein the mixed gas is air.

8. An apparatus for controlling resistivity of ultra pure water according to claim 5, wherein the mixed gas is air.

9. An apparatus for controlling resistivity of ultra pure water according to claim 5, further comprising a device which produces the mixed gas.

10. An apparatus for controlling resistivity of ultra pure water according to claim 4, wherein the hollow-fiber membrane module is of an external water-flow type comprising a housing and a bundle of a plurality of hollow fiber membranes housed in the housing, in which the mixed gas is injected inside the hollow fiber membranes, and in which the ultra pure water flows in a space between the exterior of the hollow-fiber membranes and the housing.

11. An apparatus for controlling resistivity of ultra pure water according to claim 10, further comprising a device which produces the mixed gas.

12. An apparatus for controlling resistivity of ultra pure water according to claim 10, wherein the mixed gas is air.

13. An apparatus for controlling resistivity of ultra pure water according to claim 10, further comprising a device which maintains a constant flow rate of the mixed gas.

14. An apparatus for controlling resistivity of ultra pure water according to claim 13, wherein the mixed gas is air.

15. A method for controlling resistivity of ultra pure water, comprising the steps of:

supplying a mixed gas, selected from the group consisting of a mixed gas comprising carbon dioxide and a gas having a lower resistivity controlling ability than carbon dioxide and a mixed gas comprising ammonia and a gas having a lower resistivity controlling ability than ammonia, to a flow of ultra pure water via a gas permeable membrane; and producing resistivity-controlled ultra pure water by dissolving carbon dioxide or ammonia in the ultra pure water to a concentration equal to or more than 90% of the equilibrium concentration which is determined by the concentration of carbon dioxide or ammonia in the mixed gas, the partial pressure of carbon dioxide or ammonia in the mixed gas, and the temperature of the ultra pure water.

16. A method for controlling resistivity of ultra pure water according to claim 15, wherein air is used as the mixed gas.

17. A method for controlling resistivity of ultra pure water, comprising the step of:

contacting ultra pure water with a mixed gas, selected from the group consisting of a mixed gas comprising carbon dioxide and a gas having a lower resistivity controlling ability than carbon dioxide and a mixed gas comprising ammonia and a gas having a lower resistivity controlling ability than ammonia, via a membrane module having a gas permeable membrane, the membrane module being capable of supplying carbon dioxide or ammonia to the ultra pure water so that the concentration of carbon dioxide or ammonia in the ultra pure water becomes equal to or more than 90% of the equilibrium concentration within an expected fluctuation range of the flow rate of the untreated ultra pure water, whereby resistivity-controlled ultra pure water is produced in which carbon dioxide gas or ammonia has been dissolved in a sufficient amount to obtain a desired resistivity at any flow rate of the ultra pure water supplied.

18. A method for controlling resistivity of ultra pure water according to claim 17, wherein air is used as the mixed gas.

19. A method for controlling resistivity of ultra pure water, comprising:

flowing water to the membrane module of the apparatus for controlling resistivity of ultra pure water according to claim 2.

* * * * *